United States Patent [19]

Kukes et al.

[11] Patent Number: 4,652,361

[45] Date of Patent: Mar. 24, 1987

[54] CATALYTIC HYDROFINING OF OIL

[75] Inventors: Simon G. Kukes; Stephen L. Parrott, both of Bartlesville, Okla.

[73] Assignee: Phillips Petroleum Company, Bartlesville, Okla.

[21] Appl. No.: 878,558

[22] Filed: Jun. 26, 1986

Related U.S. Application Data

[62] Division of Ser. No. 781,082, Sep. 27, 1985.

[51] Int. Cl.[4] .................... C10G 17/00; C10G 45/00
[52] U.S. Cl. ............................. 208/213; 208/251 H; 208/251 R; 502/349
[58] Field of Search ............... 208/251 H, 213, 254 H; 502/349

[56] References Cited

U.S. PATENT DOCUMENTS

| | | | |
|---|---|---|---|
| 2,206,921 | 7/1940 | Schulze | 502/349 T |
| 2,378,904 | 6/1945 | Bates | 502/349 |
| 2,984,630 | 5/1961 | Braithwaite | 502/349 |
| 3,158,567 | 11/1964 | Cole et al. | 208/213 |
| 3,642,933 | 2/1972 | Heckelsberg | 502/349 |
| 3,968,028 | 7/1976 | Frayer et al. | 208/251 H |
| 4,055,483 | 10/1977 | Mertzweiller et al. | 208/213 |
| 4,128,505 | 12/1978 | Mikousky et al. | 208/254 H |
| 4,133,744 | 1/1979 | Mitchell et al. | 208/254 H |
| 4,292,166 | 9/1981 | Gorring et al. | 208/254 H |
| 4,328,373 | 5/1982 | Strojny | 568/435 |
| 4,405,443 | 9/1983 | Bertolacini et al. | 208/113 |
| 4,430,207 | 2/1984 | Kukes | 208/251 H |
| 4,441,992 | 4/1984 | Kimble | 208/251 H |
| 4,450,068 | 5/1984 | Kukes | 208/251 H |
| 4,457,835 | 7/1984 | Kukes | 208/251 H |
| 4,492,626 | 1/1985 | Kukes | 208/251 H |

FOREIGN PATENT DOCUMENTS

| | | | |
|---|---|---|---|
| 0013607 | 2/1978 | Japan | 208/251 H |
| 0210993 | 12/1983 | Japan | 208/251 H |
| 0202190 | 10/1985 | Japan | 208/251 H |

Primary Examiner—Andrew H. Metz
Assistant Examiner—Helane Myers
Attorney, Agent, or Firm—K. K. Brandes

[57] ABSTRACT

A composition of matter consisting essentially of alumina and at least one compound (preferably oxide) of yttrium and/or zirconium is provided and is employed as a catalyst in the hydrotreating of a substantially liquid hydrocarbon containing feed stream (particularly a heavy oil) which also contains compounds of nickel, vanadium and sulfur. The preferred preparation of the catalyst compositions of this invention comprises at least one impregnating step using a solution containing at least one aluminum compound, which is at least partially converted to aluminum oxide in a subsequent calcining step.

43 Claims, No Drawings

CATALYTIC HYDROFINING OF OIL

This is a divisional application of our copending application Ser. No. 781,082, filed Sept. 27, 1985.

BACKGROUND OF THE INVENTION

This invention relates to catalytic hydrotreating of liquid hydrocarbon containing feed stream, in particular heavy petroleum fractions.

The use of alumina, promoted with transition metal compounds, for hydrotreating (e.g., demetallizing, desulfurizing, denitrogenating, hydrocracking) liquid hydrocarbon feed streams, which contain metal, sulfur and nitrogen impurities, is well known. However, there is an ever present need to develop new catalysts that are less expensive and/or more effective in removing these impurities from such feed streams than those presently employed. The removal of these impurities is desirable because they can poison catalysts in downstream operations such as catalytic cracking and can cause pollution problems when hydrocarbon products from these feed streams are used as fuels in combustion processes.

SUMMARY OF THE INVENTION

It is an object of this invention to provide an effective hydrofining catalyst composition. It is another object of this invention to provide a process for preparing a new, effective hydrofining catalyst composition. It is a still further object of this invention to employ a new catalyst composition for the removal of sulfur, nickel, vanadium and other impurities from hydrocarbon containing oils. Other objects and advantages will be apparent from the detailed description and the appended claims.

In accordance with one embodiment of this invention, there is provided a composition of matter (suitable as a catalyst composition) consisting essentially of (a) alumina and (b) at least one compound of at least one metal selected from the group consisting of yttrium and zirconium. In accordance with another embodiment of this invention, a substantially liquid hydrocarbon containing feed stream, which also contains compounds of nickel, vanadium and sulfur as impurities, is simultaneously contacted with a free hydrogen containing gas and a catalyst composition consisting essentially of (a) alumina and (b) at least one compound of at least one metal selected from the group consisting of yttrium and zirconium, under such conditions as to produce a hydrocarbon containing steam having reduced levels of nickel, vanadium and sulfur. Preferably, the catalyst component (b) is at least one of yttrium oxide ($Y_2O_3$) and zirconium oxide, more preferably $ZrO_2$.

In one preferred embodiment, the catalyst composition of this invention is prepared by a process comprising the steps of (A) impregnating (mixing) alumina with a solution (preferably aqueous) containing at least one compound of at least one metal selected from the group consisting of yttrium and zirconium, and (B) heating the material obtained in step (A) under such conditions as to dry the material from step (A) and to at least partially convert said metal compound(s) to oxides of yttrium and/or zirconium. Optionally, the solution used in step (A) can also contain at least one compound of aluminum (preferably aluminum nitrate) that is at least partially converted to aluminum oxide in step (B).

Preferably, heating step (B) is carried out in two sub-steps: ($B_1$) heating at a first temperature under such conditions as to at least partially dry the material obtained in step (A), and ($B_2$) thereafter heating (calcining) the at least partially dried material at a second temperature, which is higher than the first temperature, under such conditions as to form oxides of yttrium and/or zirconium.

In another preferred embodiment, the catalyst composition of the invention is prepared by the following steps: (D) impregnating (mixing) alumina with a solution (preferably aqueous) containing at least one aluminum compound (preferably aluminum nitrate), (E) heating the impregnated material obtained in step (D) under such conditions as to dry the material obtained in step (D) and to at least partially convert the aluminum compound to aluminum oxide, (F) impregnating (mixing) the material obtained in step (E) with a solution containing at least one compound of at least one metal selected from the group consisting of yttrium and zirconium, and (G) heating the material obtained in step (F) under such conditions as to dry it and to at least partially convert said at least one metal compound to yttrium oxide and/or zirconium oxide.

Preferably, heating step (G) is carried out in two distinct sub-steps: drying sub-step ($G_1$) at a first temperature and calcining sub-step ($G_2$) at a second, higher temperature, substantially in accordance with the procedure outlined above for ($B_1$) and ($B_2$). Also heating step (E) can be carried out in two sub-steps: drying sub-step ($E_1$) and calcining sub-step ($E_2$), essentially in accordance with the procedure outlined for ($B_1$) and ($B_2$).

In yet another embodiment, the catalyst composition of this invention is prepared by a process comprising the steps of (J) coprecipitating a hydrogel of oxides and/or hydroxides of aluminum and at least one of yttrium and zirconium from an aqueous solution containing compounds of these metals by addition of an alkaline substance (preferably ammonium hydroxide), (K) separating said hydrogel from said solution; and (L) heating the hydrogel obtained in step (K) under such conditions as to dry said hydrogel and to at least partially convert said hydrogel to oxides of aluminum and oxides of at least one of yttrium and zirconium. Preferably, heating step (L) is carried out in two distinct sub-steps: drying sub-step ($L_1$) at a first temperature and calcining sub-step ($L_2$) at a second, higher temperature, essential in accordance with the procedure outlined above for ($B_1$) and ($B_2$). A further embodiment comprises the additional steps of (M) impregnating (mixing) the material obtained in step (L), or alternatively ($L_1$), with a solution (preferably aqueous) containing at least one aluminum compound, and thereafter (N) heating the material obtained in step (M) under such conditions as to dry it and to at least partially convert said aluminum compound to aluminum oxide. Again, heating operation (N) can be carried out in two sub-steps, drying sub-step ($N_1$) at a first temperature and calcining sub-step ($N_2$) at a second, higher temperature, essentially in accordance with the procedure outlined for ($B_1$) and ($B_2$).

DETAILED DESCRIPTION OF THE INVENTION

The alumina support material used in the preparation of the catalyst composition of this invention can be substantially pure alumina or partially hydrated forms thereof. Generally the surface area (determined by BET/$N_2$; ASTM D3037) of said support material ranges from about 20 to about 350 m$^2$/g. The support material may contain traces of transition metals such as those of Groups IB, IIB, VB, VIB, VIIB and VIII of the Periodic Table (e.g., Mo and Ni) or compounds thereof, generally at a level of less than 0.05 weight-% metals, based on the weight of the entire alumina-containing material (before impregnation with Y and/or Zr). It is within the scope of this invention to employ mixtures of alumina with small amounts of substantially inert inorganic refractory materials such as silica, aluminosilicates such as (zeolites), magnesia, titania, zirconia, aluminum phosphate, zirconium phosphate, alumina-silica, alumina-titania, zeolite-alumina, zeolite-silica and the like. If a phosphate is present, the amount is generally less than 0.1 weight-% P, based on the weight of the alumina-containing support material (before impregnation with Y and/or Zr). Generally the above-mentioned essentially inert materials will not exceed about 2 weight-%, based on the weight of the alumina-containing support material.

Any suitable yttrium and zirconium compound can be employed in steps (A), (F) and (J) as long as they are at least partially soluble in the particular solvent used, preferably water. Non-limiting examples of suitable yttrium compounds are: $Y(NO_3)_3$, $YCl_3$, $Y_2(SO_4)_3$, $Y(HSO_4)_3$, yttrium carboxylates such as $Y(CH_3CO_2)_3$ and $Y_2(C_2O_4)_3$. Non-limiting examples of suitable zirconium compounds are: $ZrCl_4$, $ZrBr_4$, $ZrOCl_2$, $ZrOBr_2$, $Zr(NO_3)_4$, $ZrO(NO_3)_2$, $Zr(SO_4)_2$, $ZrOSO_4$, and zirconium carboxylates such as $Zr(C_2O_4)_2$. It is understood that these compounds may contain water and may thus exist in hydrated form. Presently preferred compounds of Y and Zr are $Y(NO_3)_3$ and $ZrO(NO_3)_2$, more preferably as hydrates.

Any suitable aluminum compound can be employed (either as required or optional agent) in steps (A), (D) and (M) as long as they are at least partially soluble in the solvent used, preferably water. Non-limiting examples of suitable aluminum compounds are: $AlF_3$, $AlCl_3$, $Al(NO_3)_3$, $Al_2(SO_4)_3$, $Al(OH)SO_4$, $Al(ClO_3)_3$, $Al(ClO_4)_3$, aluminum carboxylates such as $Al(CH_3CO_2)_3$ and aluminum alkoxides such as $Al(OCH_3)_3$. It is understood that these compounds may contain water and may thus consist in hydrated form. Presently preferred is $Al(NO_3)_3$, more preferably as hydrate.

The approximate concentrations of compounds of yttrium, zirconium and aluminum in the impregnating solutions used in steps (A), (D), (F) and (M) are given below and are expressed as the number of gram-atomic weights (herein referred to as mole) of metal per liter solution.

|  | Broad | Preferred |
| --- | --- | --- |
| Mole/l of Y (when used) | 0.01–1.0 | 0.03–0.4 |
| Mole/l of Zr (when used) | 0.01–1.0 | 0.03–0.4 |
| Mole/l of (Y + Zr) | 0.02–2.0 | 0.06–0.6 |
| Mole/l of Al (when used) | 0.02–3.0 | 0.1–1.5 |

The concentration of metal compounds in the solutions used in step (J) are chosen so as to obtain the desired weight percentage of Y, and/or Zr in the finished catalyst composition.

Impregnation steps (A), (D), (F) and (M) can be carried out in any suitable manner that results in an intimate mixture of alumina and the appropriate impregnating solution. The impregnating solution can be added to the alumina, preferably with mechanical agitation. Or alumina can be added to the appropriate impregnating solution, preferably with mechanical agitation. Or alumina and the impregnating solution can be charged substantially simultaneously to a vessel, preferably with agitation. The temperature during impregnation can range from about 33° F. to about 220° F. and will generally be about 50°–100° F. The pressure during impregnation can be about atmospheric (14–15 psia) or subatmospheric (e.g., about 1–14 psia) or superatmospheric (e.g., about 15–100 psia). The preferred pressure is about atmospheric.

Any suitable heating conditions can be employed in heating steps (B), (E), (G), (L) and (N), generally a temperature of up to 600° C. and a heating time of about 0.5–100 hours. Preferably, these above heating operations are carried out in two sub-steps:

(a) drying sub-step, e.g., ($B_1$), ($E_1$), ($G_1$), ($L_1$) and ($N_1$), at a temperature in the range of from about 30° C. to about 200° C. (preferably 50°–100° C.) for about 0.3–80 hours (preferably 1–30 hours) so as to remove the greatest portion of water from the composition to be dried, generally to a water content of less than about 20 weight-% $H_2O$ (based on the weight of the at least partially dried composition);

(b) a calcining sub-step, e.g., ($B_2$), ($E_2$), ($G_2$), ($L_2$) and ($N_2$), at a temperature in the range from about 200° C. to about 600° C. (preferably 300°–600° C.) for about 0.2–10 hours. Calcining can be carried out in a free oxygen containing atmosphere, e.g., air (preferred) or in a reducing gas atmosphere, e.g., hydrogen or CO, or in an inert gas atmosphere, e.g., nitrogen, helium, neon, argon or mixtures thereof.

Any separation means can be used for carrying out step (K), such as filtration, centrifugation and settling plus subsequent draining of the supernatant solution.

The preferred finished composition of matter (catalyst composition) of this invention generally contains from about 0.2 to about 6.0, preferably from about 0.5 to about 4.0, weight-% (Y+Zr), based on the weight of the entire catalyst composition and calculated as elements. It is understood that one or more compounds of only Y or of only Zr can be present, or that compounds of both Y and Zr can be present. The surface area (determined by the BET/$N_2$ method; ASTM D3037) of the finished composition of matter of this invention ranges from about 20 to about 350 m$^2$/g, preferably from about 100 to about 250 m$^2$/g. The prepared composition of matter can be pelletized or compacted into various shaped (e.g., spherical, cylindrical, trilobal) for convenient shipping and use in fixed beds.

The compositions of matter of this invention described above can be used as catalysts for a variety of hydrocarbon treating and conversion reactions. In one preferred embodiment of this invention, the composition of matter of this invention is used as a catalyst composition for hydrotreating substantially liquid hydrocarbon containing feed streams, which also contain compounds of nickel, vanadium and sulfur as impurities, so as to remove at least a portion of these impurities. Nitrogen compounds and coke precursors (expressed as Ramsbottom carbon residue) are generally also present in these hydrocarbon feeds.

Suitable hydrocarbon containing feed streams include crude oil and fraction thereof, petroleum products, heavy oil extracts, coal pyrolyzates, liquefied coal products, products from tar sands, shale oil and shale oil products and the like. The catalyst compositions are particularly suited for treating heavy crude oil and heavy petroleum fractions such as resids, which generally boil (under 1 atm pressure) at a temperature above 400° F., preferably above 600° F., and generally contain about 0.2-5 weight-% sulfur, about 5-500 ppmw (parts per million parts by weight) nickel and about 10-1000 ppmw vanadium. Generally these heavy oils and resids also contain nitrogen (e.g., 0.05-2 weight-%), Ramsbottom carbon residues (e.g., 3-15 weight-%) and have an API$^{60}$ gravity of about 3-20.

The hydrotreating process employing the catalyst composition of this invention can be carried out in any apparatus whereby an intimate contact of the catalyst composition of this invention with the hydrocarbon containing feed stream and a free hydrogen containing gas is achieved, under such conditions as to produce a hydrocarbon containing product having a reduced level of nickel, vanadium and sulfur. Preferably, the free hydrogen containing gas consists essentially of $H_2$. Generally, lower levels of nitrogen and Ramsbottom carbon residue and a higher value of API$^{60}$ gravity are also attained in this hydrotreating process. The hydrotreating process can be carried out using a fixed catalyst bed (presently preferred) or a fluidized catalyst bed or a moving catalyst bed or an agitated slurry of the catalyst in the oil feed (e.g., hydrovisbreaking operation). The hydrocarbon hydrotreating process can be carried out as a batch process (such as in a pressured autoclave) or, preferably, as a continuous process (such as in a tubular reactor containing one or more catalyst beds).

The catalyst composition of this invention can be used alone in a reactor or may be used in combination with essentially inert materials such as alumina, silica, titania, magnesia, silicates, metal aluminates (such as zinc aluminate), alumino-silicates (e.g., zeolites), titania and metal phosphates (such as $AlPO_4$, $Zr_3(PO_4)_2$). Alternating layers of the inert material and of the catalyst composition can be used, or the catalyst composition can be mixed with the inert material. Use of the inert material with the catalyst composition provides for better dispersion of the hydrocarbon containing feed stream. Also, other catalysts such as known hydrogenation and hydrotreating catalysts (e.g., $CoO/MoO_3$ on alumina, $NiO/MoO_3$ on alumina or $NiO/CoO/MoO_3$ on alumina) may be used with the catalyst composition of this invention to achieve simultaneous demetallization, desulfurization, denitrogenation, hydrogenation and hydrocracking, if desired.

Generally, the reaction time, i.e., the time of intimate contact of hydrocarbon feed, hydrogen containing gas and catalyst composition, will range from about 0.05 to about 10 hours, preferably from about 0.25 to about 5 hours. Thus, the flow rate of the hydrocarbon containing feed stream in a continuous operation should be such that the time required for the passage of the mixture through the reactor will be in the range of about 0.05 to about 10 hours, preferably 0.25-5 hours. In a continuous fixed bed operation, this generally requires a liquid hourly space velocity (LHSV) in the range of about 0.10 to about 20 cc of feed per cc of catalyst per hour, preferably from about 0.2 to about 4.0 cc/cc/hr.

The hydrotreating process employing the catalyst composition of the present invention can be carried out at any suitable temperature. The reaction temperature will generally be in the range of about 250° C. to about 550° C. and will preferably be in the range of about 300° C. to about 450° C. Higher temperatures do improve the removal of nitrogen and other impurities, but temperatures that will have adverse effects on the hydrocarbon containing feed stream such as excessive coking will usually be avoided. Also, economic considerations will usually be taken into account in selecting the operating temperature. Lower temperatures can generally be used for lighter feeds such as light cycle oils.

Any suitable pressure may be utilized in the hydrotreating process of this invention. The reaction pressure will generally be in the range of about atmospheric pressure (0 psig) to up to about 5,000 psig. Preferably, the pressure will be in the range of about 100 to about 2500 psig. Higher pressures tend to reduce coke formation, but operation at high pressure may have adverse economic consequences.

Any suitable quantity of hydrogen gas can be added to the hydrotreating process. The quantity of hydrogen gas used to contact the hydrocarbon containing feed stock will generally be in the range of about 100 to about 10,000 standard cubic feet $H_2$ per barrel of the hydrocarbon containing feed stream and will more preferably be in the range of about 1000 to about 6000 standard cubic feet per barrel of the hydrocarbon containing feed stream.

In general, the catalyst composition is utilized primarily for demetallization and desulfurization until a satisfactory level of metals and sulfur removal is no longer achieved which generally results from the coating of the catalyst composition with coke and metals being removed from the feed. It is generally contemplated that once the removal of metals (primarily Ni and V) and sulfur falls below a desired level, the used (deactivated) catalyst will simply be replaced by a fresh catalyst.

Generally, at least a portion of the hydrotreated product stream having reduced nickel, vanadium and sulfur contents is subsequently cracked in a cracking reaction, e.g. in a fluidized catalytic cracking unit using a zeolite catalyst, under such conditions as to produce lower boiling hydrocarbon materials suitable for use as gasoline, diesel fuel, lubricating oils and other useful products. It is within the scope of this invention to hydrotreat said product stream having reduced nickel, vanadium and sulfur contents in one or more processes using different catalyst compositions, such as commercial alumina-supported $NiO/MoO_3$, $CoO/MoO_3$ or $NiO/CoO/MoO_3$ catalysts, for further removal of sulfur and of nitrogen impurities, before the product stream is introduced into the cracking reactor and treated under cracking conditions.

It is also within the scope of this invention, to pass the hydrocarbon feed stream with hydrogen gas through a guard bed filled with a suitable demetallizing material such as alumina (with or without promoter metal) so as to remove some metals from the feed, before the feed is hydrotreated with the catalyst composition of this invention. It is also within the scope of this invention to employ one or more decomposable compounds of metals belonging to Groups IB, IVB, VB, VIB, VIIB and VIII of the Periodical Table of Elements, preferably molybdenum hexacarbonyl, molybdenum dithiophosphate and molybdenum dithiocarbamate, which are added to the hydrocarbon feed, in the hydrotreating process of this invention. Generally the metal content of these decomposable compounds in the feed is about 1-100 ppmw metal (e.g., Mo), based on the entire feed stream.

The following examples are presented in further illustration of the invention and are not to be considered as unduly limiting the scope of this invention.

EXAMPLE I

This example illustrates the preparation of several alumina-supported hydrofining catalysts.

Catalyst A

This catalyst was essentially unpromoted commercial alumina, provided by Ketjen Catalyst Division of Akzona, Inc., Pasadena, Tex. The surface area of this material was about 159 m²/g (determined by the BET/$N_2$ method; ASTM D3037); and its pore volume (determined by mercury porosimetry) was about 1.03 cc/g.

Catalyst B 1.61 grams of $ZrO(NO_3)_2 \cdot 5.2H_2O$ (water of hydration determined by calcining at 600° C.) were dissolved in water to provide a solution of 25 cc. This solution was thoroughly mixed with 22.0 grams of alumina (Catalyst A). After having been placed in an open dish for several hours, the thus impregnated material was dried for several hours under a 250 watt heat lamp. The dry catalyst material was placed into a quartz tube, and air was passed over the material at a rate of 1 SCF/hr, while the quartz tube was heated as follows: 100°→400° F. within 0.5 hours, 400° F. for 2 hours, 400°→500° F. within 0.5 hour, 500° F., for 1 hour, 500°→800° F. within 0.5 hour, 800° F. for 3 hours, 800° F.→room temperature within about 2 hours. Catalyst B contained about 2 weight-% Zr.

Catalyst C 23.0 grams of alumina (Catalyst A) were thoroughly mixed with 27 cc of an aqueous solution containing 2.03 grams of $Y(NO_3)_3 \cdot 6H_2O$. The thus impregnated material was air-dried for one hour and then dried and calcined, essentially in accordance with the procedure described for Catalyst B. Catalyst C contained about 2 weight-% Y.

Catalyst D

This catalyst was alumina (Catalyst A) impregnated with about 2 weight-% Al. Catalyst D was prepared as follows. 24.0 grams of Catalyst A were thoroughly mixed with 27 cc of an aqueous solution containing 6.94 grams of $Al(NO_3)_3 \cdot 9H_2O$. The mixture was air-dried in an open dish for about 1 hour. Then the material was dried and calcined, essentially in accordance with the procedure outlined for Catalyst B.

EXAMPLE II

In this example, the automated experimental setup for investigating the hydrofining of heavy oils in accordance with the present invention is described. Oil was pumped downward through an induction tube into a trickle bed reactor, 28.5 inches long and 0.75 inches in diameter. The oil pump used was a reciprocating pump with a diaphragm-sealed head. The oil induction tube extended into a catalyst bed (located about 3.5 inches below the reactor top) comprising a top layer of about 40 cc of low surface area α-alumina (14 grit Alundum; surface area less than 1 m²/gram), a middle layer of a mixture of 50 cc of hydrofining catalyst (A, B, C or D) and 70 cc of 36 grit Alundum, and a bottom layer of about 30 cc of α-alumina.

The oil feed was a Maya 400F+ residum containing about 4.0 weight-% sulfur, about 62 ppmw (parts per million by weight) nickel, about 302 ppmw vanadium, about 12.7 weight-% Ramsbottom carbon residue, about 0.44 weight-% nitrogen, and having an API$^{60}$ gravity of 14.1.

Hydrogen was introduced into the reactor through a tube that concentrically surrounded the oil induction tube but extended only to the reactor top. The reactor was heated with a 3-zone furnace. The reactor temperature was measured in the catalyst bed at three different locations by three separate thermocouples embedded in axial thermocouple well. The liquid product oil was generally collected every day for analysis. Excess hydrogen gas was vented. The concentrations of vanadium and nickel in the oil were determined by plasma emission analysis; sulfur content was measured by X-ray fluorescence spectrometry; Ramsbottom carbon residue was determined in accordance with ASTM D524; and N content was measured in accordance with ASTM D3228.

EXAMPLE III

This example illustrates the removal of metals and sulfur from a heavy feed (Maya 400F) by hydrotreatment in the presence of Catalysts A–D. Pertinent process conditions and test results are summarized in Table I. Only truly comparable run samples obtained at LHSV (cc feed per hour per cc catalyst) values ranging from 0.85 to 1.15, after at least 2 days on stream are listed. The percent removal of (Ni+V) was corrected for variations in flow rate based on first order kinetics so as to give results one would have obtained at 1.0 LHSV.

TABLE I

| Run | Catalyst | Hours on Stream | Temp. (°F.) | Flow Rate (LHSV) | % Removal of S | % Removal of (Ni + V) | Wt % Metal Loading on Catalyst |
|---|---|---|---|---|---|---|---|
| 1 | A | 88 | 750 | 1.00 | 10.7 | 16.8 | 0.81 |
| (Control) | | 104 | " | 1.00 | 20.1 | 44.2[1] | 1.41 |
| | | 129 | " | 1.00 | 9.3 | 29.4 | 2.03 |
| | | 153 | " | 0.95 | 16.1 | 46.7 | 2.96 |
| | | 173 | " | 0.91 | 16.7 | 48.9 | 3.76 |
| | | 197 | " | 0.93 | 4.2[1] | 53.5 | 4.81 |
| | | 223 | " | 1.00 | 20.3 | 59.0 | 6.11 |
| | | 249 | " | 0.93 | 18.9 | 57.6 | 7.34 |
| | | 274 | " | 0.93 | 22.3 | 60.1 | 8.57 |
| | | 299 | " | 0.93 | 24.3 | 59.9 | 9.80 |
| | | 326 | " | 0.93 | 24.6 | 61.4 | 11.16 |
| 2 | B | 51 | " | 1.00 | 18.2 | 45.5 | 1.73 |
| (Invention) | | 75 | " | 0.99 | 12.1 | 52.0 | 2.80 |
| | | 99 | " | 0.96 | 20.6 | 58.6 | 3.94 |
| | | 123 | " | 0.96 | 22.7 | 62.2 | 5.18 |
| | | 147 | " | 1.01 | 27.6 | 63.8 | 6.48 |

TABLE I-continued

| Run | Catalyst | Hours on Stream | Temp. (°F.) | Flow Rate (LHSV) | % Removal of S | % Removal of (Ni + V) | Wt % Metal Loading on Catalyst |
|---|---|---|---|---|---|---|---|
| | | 171 | " | 1.01 | 27.6 | 65.5 | 7.80 |
| | | 195 | " | 1.10 | 27.3 | 70.1 | 9.28 |
| | | 219 | " | 1.06 | 31.5 | 68.1 | 10.69 |
| | | 243 | " | 1.00 | 24.6 | 68.3 | 12.07 |
| 3 (Invention) | C | 77 | " | 0.86 | 0[1] | 29.4 | 1.79 |
| | | 152 | " | 1.05 | 22.6 | 59.6 | 4.74 |
| | | 178 | " | 0.99 | 25.0 | 59.9 | 6.01 |
| | | 205 | " | 0.90 | 30.9 | 61.4 | 7.30 |
| | | 310 | " | 1.02 | 25.5 | 65.3 | 12.88 |
| 4 (Invention) | D | 57 | " | 0.92 | 13.1 | 32.0 | 1.10 |
| | | 90 | " | 0.97 | 14.0 | 42.4 | 2.34 |
| | | 138 | " | 1.03 | 17.4 | 49.5 | 4.48 |
| | | 162 | " | 1.01 | 24.1 | 57.0 | 5.71 |
| | | 186 | " | 0.99 | 18.0 | 56.5 | 6.92 |
| | | 210 | " | 1.00 | 25.0 | 59.6 | 8.20 |
| | | 234 | " | 0.96 | 27.1 | 60.2 | 9.47 |
| | | 258 | " | 1.01 | 19.8 | 60.4 | 10.77 |
| | | 282 | " | 0.98 | 27.7 | 63.8 | 12.12 |

[1]Result believed to be erroneous.

Data in Table I show that the removal of metals (Ni and V) and of sulfur was higher, at comparable times on stream, when invention catalysts B ($ZrO_2/Al_2O_3$) and C ($Y_2O_3/Al_2O_3$) were used in lieu of control catalyst A ($Al_2O_3$). The presently preferred invention catalyst is $ZrO_2/Al_2O_3$.

Table I also indicates that the demetallization/desulfurization activity of alumina was generally increased when the alumina support material was impregnated with an aluminum compound. Based on this result, it is presently preferred to either (A) impregnate coprecipitated $ZrO_2/Al_2O_3$ or $Y_2O_3/Al_2O_3$ with a solution of suitable aluminum compound and then calcine the thus impregnated material or to (b) impregnate alumina with a solution of an aluminum compound, calcine the thus treated alumina, impregnate the calcined alumina with a solution of one or more zirconium and/or yttrium compounds and calcine the thus impregnated alumina again.

Additional test data that are not listed in Table I indicated that suprisingly no consistent advantage in terms of desulfurization activity was realized when alumina was impregnated with 2 weight-% Ti (as oxide), which is a Group IVB element as is Zr (component of Catalyst B).

EXAMPLE IV

This example illustrates the effect of the addition of small amounts of a decomposable molybdenum compound, $Mo(CO)_6$, to an undiluted Monagas pipeline oil feed containing about 336 ppm V and about 87 ppm Ni on the removal of these metals in the presence of a commercial hydrofining catalyst containing about 0.9 weight-% CoO, 0.5 weight-% NiO, 7.3 weight-% MoO and about 91 weight-% $Al_2O_3$, having a surface area of about 180 m²/g). LHSV of the feed for both runs ranged from about 1.0 to 1.1 cc/cc catalyst/hr, the temperature was about 765° C. (407° C.), the pressure was about 2250 psig, and the hydrogen feed rate was about 4800 SCF/barrel oil. Experimental data are summarized in Table II.

TABLE II

| on Stream | PPM Mo in Feed | % Removal of (Ni + V) | PPM Mo in Feed | % Removal % (Ni + V) |
|---|---|---|---|---|
| 5 | 0 | 64 | 17 | 72 |
| 12–13 | 0 | 62 | 17 | 71 |
| 17 | 0 | 59 | 7 | 70 |
| 20–21 | 0 | 61 | 7 | 65 |
| 26 | 0 | 58 | 7 | 64 |
| 32–33 | 0 | 53 | 7 | 65 |
| 41 | 0 | 52 | 7 | 70 |
| 52–53 | 0 | 41 | 7 | 66 |
| 58–59 | 0 | 43 | 4 | 65 |

Data in Table II clearly show the beneficial effect of added small amounts of Mo (as $Mo(CO)_6$) to the feed on the demetallization of the oil when a commercial hydrofining catalyst was used. Based on these results, it is presently preferred to introduce a decomposable compound such as $Mo(CO)_6$ into the feed that is hydrotreated with the catalyst compositions of this invention.

Removable variations and modifications are possible within the scope of the disclosure and the appended claims.

We claim:

1. A process for hydrotreating a hydrocarbon containing feed stream comprising the step of intimately contacting a substantially liquid hydrocarbon containing feed stream, which also contains compounds of nickel, vanadium and sulfur, with a free hydrogen containing gas and a catalyst composition consisting essentially of (a) alumina and (b) at least one compound selected from the group consisting of yttrium oxide and zirconium oxide, under such hydrotreating conditions as to produce a hydrocarbon containing feed stream having a reduced level of nickel, vanadium and sulfur; wherein said catalyst composition has been prepared by a method comprising the steps of:
   (A) impregnating alumina with a solution containing at least one compound of at least one metal selected from the group consisting of yttrium and zirconium and at least one compound of aluminum;
   (B) heating the material obtained in step (A) under such conditions as to dry the material from step (A) and to at least partially convert said at least one compound of at least one metal to at least one of yttrium oxide and zirconium oxide and said at least one compound of aluminum to aluminum oxide.

2. A process in accordance with claim 1, wherein heating step (B) is carried out in two sub-steps:

(B₁) heating the material obtained in step (A) at a first temperature so as to at least partially dry the material from step (A), and (B₂) thereafter heating the at least partially dried material obtained in sub-step (B₁) at a second temperature, which is higher than said first temperature, under such conditions as to form aluminum oxide and at least one of yttrium oxide and zirconium oxide.

3. A process in accordance with claim 1, wherein said solution used in step (A) is an aqueous solution and contains about 0.01–1.0 mole/l of Y and about 0.02–3.0 mole/l of Al.

4. A process in accordance with claim 1, wherein said catalyst composition consists essentially of (a) alumina and (b) yttrium oxide, and has a surface area in the range of from about 20 to about 350 m²/g.

5. A process in accordance with claim 1, wherein said solution used in step (A) is an aqueous solution and contains about 0.01–1.0 mole/l of Zr and about 0.02–3.0 mole/l of Al.

6. A process in accordance with claim 1, wherein said catalyst composition consists essentially of (a) alumina and (b) zirconium oxide, and has a surface area in the range of from about 20 to about 350 m²/g.

7. A process in accordance with claim 1, wherein said hydrocarbon containing feed stream contains about 5–500 ppmw nickel, about 10–1,000 ppmw vanadium and about 0.2–5 weight-% sulfur.

8. A process in accordance with claim 1, wherein said hydrotreating conditions comprise a reaction temperature in the range of from about 250° C. to about 550° C., a reaction pressure in the range of from about 0 to about 5,000 psig, a reaction time in the range of from about 0.05 to about 10 hours, and an amount of added hydrogen gas in the range of from about 100 to about 10,000 standard cubic feet H₂ per barrel of the hydrocarbon containing feed stream.

9. A process in accordance with claim 1, wherein said hydrotreating conditions comprise a reaction temperature in the range of from about 300° C. to about 450° C., a reaction pressure in the range of from about 100 to about 2,500 psig, a reaction time in the range of from about 0.25 to about 5 hours, and an amount of added hydrogen gas in the range of from about 1,000 to about 6,000 standard cubic feet H₂ per barrel of the hydrocarbon containing feed stream.

10. A process in accordance with claim 1, wherein to said hydrocarbon containing feed stream has been added at least one decomposable compound of a metal selected from the group consisting of metals belonging to Groups IB, IVB, VB, VIB, VIIB and VIII of the Periodic Table of Elements.

11. A process in accordance with claim 10, wherein said at least one decomposable compound of a metal is a molybdenum compound, and the molybdenum content in the hydrocarbon containing feed stream is about 1–100 ppmw Mo, based on the entire hydrocarbon containing feed stream.

12. A process for hydrotreating a hydrocarbon containing feed stream comprising the step of intimately contacting a substantially liquid hydrocarbon containing feed stream, which also contains compounds of nickel, vanadium and sulfur, with a free hydrogen containing gas and a catalyst composition consisting essentially of (a) alumina and (b) at least one compound selected from the group consisting of yttrium oxide and zirconium oxide, under such hydrotreating conditions as to produce a hydrocarbon containing stream having a reduced level of nickel, vanadium and sulfur; wherein said catalyst composition has been prepared by a method comprising the steps of:

(D) impregnating alumina with a solution containing at least one compound of aluminum;

(E) heating the material obtained in step (D) under such conditions as to dry the material from step (D) and to at least partially convert said at least one compound of aluminum to aluminum oxide;

(F) impregnating the material obtained in step (E) with a solution containing at least one compound of at least one metal selected from the group consisting of yttrium and zirconium; and (G) heating the material obtained in step (F) under such conditions as to dry the material from step (F) and to at least partially convert said at least one compound of at least one metal to at least one of yttrium oxide and zirconium oxide.

13. A process in accordance with claim 12, wherein heating step (E) is carried out in two sequential sub-steps:

(E₁) heating the material obtained in step (D) at a first temperature so as to at least partially dry the material from step (D); and (E₂) thereafter heating the at least partially dried material obtained in sub-step (E₁) at a second temperature, which is higher than said first temperature, under such conditions as to convert said at least one aluminum compound to aluminum oxide; and wherein heating step (G) is carried out in two sequential sub-steps:

(G₁) heating the material obtained in step (F) at a first temperature so as to at least partially dry the material from step (F); and (G₂) thereafter heating the at least partially dried material obtained in sub-step (G₁) at a second temperature, which is higher than said first temperature, under such conditions as to form at least one of yttrium oxide and zirconium oxide.

14. A process in accordance with claim 12, wherein said solution used in step (D) is aqueous and contains about 0.2–3.0 mole/l of Al, and said solution used in step (F) is aqueous and contains about 0.01–1.0 mole/l of Y.

15. A proces in accordance with claim 12, wherein said catalyst composition consists essentially of (a) alumina and (b) yttrium oxide, and has a surface area in the range of from about 20 to about 350 m²/g.

16. A process in accordance with claim 12, wherein said solution used in step (D) is aqueous and contains about 0.2–3.0 mole/l of Al, and said solution used in step (F) is aqueous and contains about 0.01–1.0 mole/l of Zr.

17. A process in accordance with claim 12, wherein said catalyst composition consists essentially of (a) alumina and (b) zirconium oxide, and has a surface area in the range of from about 20 to about 350 m²/g.

18. A process in accordance with claim 12, wherein said hydrocarbon containing feed contains about 5–500 ppmw nickel, about 10–1,000 ppmw vanadium and about 0.2–5 weight-% sulfur.

19. A process in accordance with claim 12, wherein said hydrotreating conditions comprise a reaction temperature in the range of from about 250° C. to about 550° C., a reaction pressure in the range of from about 0 to about 5,000 psig, a reaction time in the range of from about 0.05 to about 10 hours, and an amount of added hydrogen gas in the range of from about 100 to about 10,000 standard cubic feet $H_2$ per barrel of the hydrocarbon containing feed stream.

20. A process in accordance with claim 12, wherein said hydrotreating conditions comprise a reaction temperature in the range of from about 300° C. to about 450° C., a reaction pressure in the range of from about 100 to about 2,500 psig, a reaction time in the range of from about 0.25 to about 5 hours, and an amount of added hydrogen gas in the range of from about 1,000 to about 6,000 standard cubic feet $H_2$ per barrel of the hydrocarbon containing feed stream.

21. A process in accordance with claim 12, wherein to said hydrocarbon containing feed stream has been added at least one decomposable compound of a metal selected from the group consisting of metals belonging to Groups IB, IVB, VB, VIB, VIIB and VIII of the Periodic Table of Elements.

22. A process in accordance with claim 21, wherein said at least one decomposable compound of a metal is a molybdenum compound, and the molybdenum content in the hydrocarbon containing feed stream is about 1–100 ppmw Mo, based on the entire hydrocarbon containing feed stream.

23. A process for hydrotreating a hydrocarbon containing feed stream comprising the step of intimately contacting a substantially liquid hydrocarbon containing feed stream, which also contains compounds of nickel, vanadium and sulfur, with a free hydrogen containing gas and a catalyst composition consisting essentially of (a) alumina and (b) at least one compound selected from the group consisting of yttrium oxide and zirconium oxide, under such hydrotreating conditions as to produce a hydrocarbon containing stream having a reduced level of nickel, vanadium and sulfur; wherein said catalyst composition has been prepared by a method comprising the steps of:

(J) adding an alkaline substance to an aqueous solution containing at least one compound of aluminum and at least one compound of at least one metal selected from the group consisting of yttrium and zirconium so as to coprecipitate a hydrogel of oxides and/or hydroxides of aluminum and at least one of yttrium and zirconium;

(K) separating said formed hydrogel from said aqueous solution;

(L) heating the hydrogel obtained in step (K) under such conditions as to dry the hydrogel from step (K) and at least partially convert the hydrogel from step (K) to oxides of aluminum and of at least one of yttrium and zirconium;

(M) impregnating the material obtained in step (L) with a solution containing at least one compound of aluminum; and (N) heating the material obtained in step (M) under such conditions as to dry the material from step (M) and to at least partially convert said at least one compound of aluminum used in step (M) to aluminum oxide.

24. A process in accordance with claim 23, wherein heating step (L) is carried out in two sequential substeps:

($L_1$) heating the hydrogel obtained in step (K) at a first temperature so as to at least partially dry said hydrogel, and ($L_2$) thereafter heating the at least partially dried hydrogel obtained in sub-step ($L_1$) at a second temperature, which is higher than said first temperature, under such conditions as to form oxides of aluminum and of at least one of yttrium and zirconium.

25. A process in accordance with claim 23, wherein said aqueous solution used in step (J) contains about 0.1–1.0 mole/l of Y and said solution used in step (M) is aqueous and contains about 0.02–3.0 mole/l of Al.

26. A process in accordance with claim 23, wherein said catalyst composition consists essentially of (a) alumina and (b) yttrium oxide, and has a surface area in the range of from about 20 to about 250 $m^2/g$.

27. A process in accordance with claim 23, wherein said aqueous solution used in step (J) contains about 0.01–1.0 mole/l of Zr and said solution used in step (M) is aqueous and contains about 0.02–3.0 mole/l of Al.

28. A process in accordance with claim 23, wherein said catalyst composition consists essentially of (a) alumina and (b) zirconium oxide, and has a surface area in the range of from about 20 to about 350 $m^2/g$.

29. A process in accordance with claim 23, wherein said hydrocarbon containing feed stream contains about 5–500 ppmw nickel, about 10–1,000 ppmw vanadium and about 0.2–5 weight-% sulfur.

30. A process in accordance with claim 23, wherein said hydrotreating conditions comprise a reaction temperature in the range of from about 250° C. to about 550° C., a reaction pressure in the range of from about 0 to about 5,000 psig, a reaction time in the range of from about 0.05 to about 10 hours, and an amount of added hydrogen gas in the range of from about 100 to about 10,000 standard cubic feet $H_2$ per barrel of the hydrocarbon containing feed stream.

31. A process in accordance with claim 23, wherein said hydrotreating conditions comprise a reaction temperature in the range of from about 300° C. to about 450° C., a reaction pressure in the range of from about 100 to about 2,500 psig, a reaction time in the range of from about 0.25 to about 5 hours, and an amount of added hydrogen gas in the range of from about 1,000 to about 6,000 standard cubic feet $H_2$ per barrel of hydrocarbon containing feed stream.

32. A process in accordance with claim 23, wherein to said hydrocarbon containing feed stream has been added at least one decomposable compound of a metal selected from the group consisting of metals belonging to Groups IB, IVB, VB, VIB, VIIB and VIII of the Periodic Table of Elements.

33. A process in accordance with claim 32, wherein said at least one decomposable compound of a metal is a molybdenum compound, and the molybdenum content in the hydrocarbon containing feed stream is about 1–100 ppmw Mo, based on the entire hydrocarbon containing feed stream.

34. A process for hydrotreating a hydrocarbon containing feed stream comprising the step of intimately contacting a substantially liquid hydrocarbon containing feed stream, which also contains compounds of nickel, vanadium and sulfur, with a free hydrogen containing gas and a catalyst composition consisting essentially of (a) alumina, (b) at least one compound of yttrium and (c) at least one compound of zirconium, under such hydrotreating conditions as to produce a hydrocarbon containing stream having a reduced level of nickel, vanadium and sulfur.

35. A process in accordance with claim 34, wherein the weight percentage of (Y+Zr) in said catalyst composition is in the range of from about 0.2 to about 6.0, and the surface area of said catalyst composition is in the range of from about 20 to about 350 $m^2/g$.

36. A process in accordance with claim 34, wherein the weight percentage of (Y+Zr) in said catalyst composition is in the range of from about 0.5 to about 4.0, and the surface area of said catalyst composition is in the range of from about 20 about 350 m$^2$/g.

37. A process in accordance with claim 34, wherein said at least one compound of yttrium is $Y_2O_3$.

38. A process in accordance with claim 34, wherein said at least one compound of zirconium is $ZrO_2$.

39. A process in accordance with claim 34, wherein said hydrocarbon containing feed stream contains about 5-5,000 ppmw nickel, about 10-1,000 ppmw vanadium and about 0.2-5 weight-% sulfur.

40. A process in accordance with claim 34, wherein said hydrotreating conditions comprise a reaction temperature in the range of from about 250° C. to about 550° C., a reaction pressure in the range of from about 0 to about 5,000 psig, a reaction time in the range of from about 0.05 to about 10 hours, and an amount of added hydrogen gas in the range of from about 100 to about 10,000 standard cubic feet H$_2$ per barrel of the hydrocarbon containing feed stream.

41. A process in accordance with claim 34, wherein said hydrotreating conditions comprise a reaction temperature in the range of from about 300° C. to about 450° C., a reaction pressure in the range of from about 100 to about 2,500 psig, a reaction time in the range of from about 0.25 to about 5 hours, and an amount of added hydrogen gas in the range of from about 1,000 to about 5,000 standard cubic feet H$_2$ per barrel of the hydrocarbon containing feed stream.

42. A process in accordance with claim 34, wherein to said hydrocarbon containing feed stream has been added at least one decomposable compound of a metal selected from the group consisting of metals belonging to Groups IB, IVB, VB, VIB, VIIB and VIII of the Periodic Table of Elements.

43. A process in accordance with claim 42, wherein said at least one decomposable compound of a metal is a molybdenum compound, and the molybdenum content in the hydrocarbon containing feed stream is about 1-100 ppmw Mo, based on the entire hydrocarbon containing feed stream.

* * * * *